US007970661B1

(12) United States Patent
Abraham et al.

(10) Patent No.: US 7,970,661 B1
(45) Date of Patent: Jun. 28, 2011

(54) METHOD, MEDIUM, AND SYSTEM FOR ALLOCATING A TRANSACTION DISCOUNT DURING A COLLABORATIVE SHOPPING SESSION

(75) Inventors: Subil M. Abraham, Plano, TX (US); Rajaraman Hariharan, Chennai (IN); Ramakrishnan Kannan, Bangalore (IN); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/690,553

(22) Filed: Jan. 20, 2010

(51) Int. Cl.
*G06Q 30/00* (2006.01)
(52) U.S. Cl. .......... 705/26.1; 705/26.2; 705/14.23; 705/14.39; 705/319
(58) Field of Classification Search .......... 705/26.1, 705/27.1, 14.1, 14.39, 14.23, 319
See application file for complete search history.

(56) References Cited

U.S. PATENT DOCUMENTS

| 5,878,400 | A  | * | 3/1999 | Carter, III | 705/20 |
| 6,269,343 | B1 | * | 7/2001 | Pallakoff | 705/26.2 |
| 6,876,977 | B1 | * | 4/2005 | Marks | 705/26.62 |
| 6,925,444 | B1 | * | 8/2005 | McCollom et al. | 705/14.51 |
| 7,480,627 | B1 | * | 1/2009 | Van Horn et al. | 705/26.2 |
| 7,593,871 | B1 | * | 9/2009 | Mesaros | 705/26.2 |
| 7,840,447 | B2 | * | 11/2010 | Kleinrock et al. | 705/26.8 |
| 2003/0126040 | A1 | * | 7/2003 | Mesaros | 705/26 |
| 2005/0022119 | A1 | * | 1/2005 | Kraemer | 715/513 |
| 2005/0096997 | A1 | * | 5/2005 | Jain et al. | 705/26 |
| 2005/0177446 | A1 | * | 8/2005 | Hoblit | 705/26 |
| 2006/0122895 | A1 | * | 6/2006 | Abraham et al. | 705/26 |
| 2007/0078727 | A1 | * | 4/2007 | Spiegel et al. | 705/26 |
| 2007/0179867 | A1 | * | 8/2007 | Glazer et al. | 705/27 |
| 2007/0239552 | A1 | * | 10/2007 | Sundaresan | 705/26 |

(Continued)

FOREIGN PATENT DOCUMENTS

| GB | 2458388 A | 9/2009 |
| WO | 0127837 A2 | 4/2001 |

OTHER PUBLICATIONS

Puglia, S, et al., "MultiECommerce: A Distributed Architecture for Collaborative Shopping on the WWW," EC'00, Proceedings of the 2nd ACM Conference on Electronic Commerce, 215-24, 2000.*

(Continued)

*Primary Examiner* — Yogesh C Garg
*Assistant Examiner* — Matthew Zimmerman
(74) *Attorney, Agent, or Firm* — Patents on Demand, P.A.; Brian K. Buchheit; Scott M. Garrett

(57) ABSTRACT

A collaborative shopping group can be established within a social networking web site. This initially established group can consist of individuals with whom the establishing user has a social networking affiliation. After an initial establishment of the collaborative shopping group, each individual within the group is able to add additional individuals to the collaborative shopping group. A shared shopping cart can be established for the collaborative shopping group. A set of different members of the collaborative shopping group can individually and independently add items from a set of different e-commerce sites to the shared shopping cart. An e-commerce purchase of items in the shared shopping cart can be completed. The completed e-commerce purchase can receive a transaction discount greater than or equal to a sum of discounts that would have resulted from discrete purchases of the items of the shared shopping cart by the individuals of the collaborative shopping group.

19 Claims, 8 Drawing Sheets

U.S. PATENT DOCUMENTS

2009/0043670 A1* 2/2009 Johansson et al. ............. 705/26
2009/0043674 A1* 2/2009 Minsky et al. ................. 705/27
2009/0106085 A1* 4/2009 Raimbeault .................... 705/10
2009/0172565 A1* 7/2009 Jackson et al. ............... 715/753
2009/0265255 A1* 10/2009 Jackson et al. ................ 705/27
2010/0030578 A1* 2/2010 Siddique et al. ................ 705/3
2011/0016023 A1* 1/2011 Zakas ......................... 705/27.1

OTHER PUBLICATIONS

Puglia, S. et al., "MultECommerce: A Distributed Architecture for Collaborative Shopping on the WWW," EC'00, Proceedings of the 2nd ACM Conference on Electronic Commerce, 215-24, 2000.

* cited by examiner

METHOD, MEDIUM, AND SYSTEM FOR ALLOCATING A TRANSACTION DISCOUNT DURING A COLLABORATIVE SHOPPING SESSION

BACKGROUND

The present invention relates to the field of online shopping systems and, more particularly, to a collaborative online shopping system.

Shopping has been a social experience for centuries—from ancient marketplaces to today's outlet malls. However, much of this social interaction has been lost in the shift to Web-based or online shopping systems. In the attempt to interject more social interaction, many online shopping systems have introduced features such as wish lists, recommendation lists, user-submitted product feedback, shopping carts that are viewable by others, and universal shopping carts that aggregate products from a defined group of retailers. While these attempts provide their own benefit to online shopping, the online shopping systems lack the automated social communication aspect popularized by social networking Websites such as FACEBOOK, MYSPACE, and ORKUT, where information is automatically made available from one account holder to other account holders based on established relationships For example, two friends, Shopper A and Shopper B, both have accounts for shopping at the same online retailer. Both shoppers have a stored shopping cart with a couple of product items, intending to make their purchases when the value of their respective shopping carts qualifies for a discounted shipping rate. Unless Shopper A and Shopper B explicitly share information about their stored shopping carts, which must occur outside of the shopping Website (e.g., lists the contents in an email or telephone call), neither will be aware that the combination of their two shopping carts qualifies for discounted shipping. Simply, the online shopping system does not "know" that Shopper A knows Shopper B or that either shopper may be interested in combining their purchases.

Newer attempts, such as that described in Great Britain Patent No. 2458388A, have focused on simulating the shopping experience in virtual marketplaces. Three-dimensional (3D) models of the shoppers are able to communicate and perform many typical shopping actions in a virtual representation of a store. However, such a graphics-intensive system incurs additional overhead for both the host system and the shopper's system to support the 3D modeling of the shoppers and virtual environment.

Although this system allows multiple users to aggregate selected product items into a single purchase with a single vendor and even split costs, it does not support a social network structure between the shoppers or the use of a universal shopping cart. Nor does this system support the ability for one shopper to apply a coupon or promotion code to the purchase to be shared among the shoppers, a very common reason shoppers combine purchases or purchase additional items. Further, a shopper viewing another shopper's shopping cart, any actions that the viewing shopper may want to take such as creating a copy of the shopping cart for their own purposes must be reiterated manually.

BRIEF SUMMARY

One aspect of the invention, a collaborative shopping group can be established within a social networking web site. This initially established group can consist of individuals with whom the establishing user has a social networking affiliation. After an initial establishment of the collaborative shopping group, each individual within the group is able to add additional individuals to the collaborative shopping group. A shared shopping cart can be established for the collaborative shopping group. A set of different members of the collaborative shopping group can individually and independently add items from a set of different e-commerce sites to the shared shopping cart. Each of the different e-commerce sites can have a unique URL and can be independently owned and operated from the social networking site and from each other. An e-commerce purchase of items in the shared shopping cart can be completed. The completed e-commerce purchase can receive a transaction discount greater than or equal to a sum of discounts that would have resulted from discrete purchases of the items of the shared shopping cart by the individuals of the collaborative shopping group. Thus, use of the collaborative shopping group saves group members money, which may be due to bulk discounts, shipping discounts, combination purchasing discounts, reward program discounts, and the like. Outside of the collaborative shopping group, none of the individual members or individual purchases may have quantified for the discounts received by the group.

In one aspect of the disclosure, a shared shopping cart can be established for use by a set of different collaborative shoppers. Each of the collaborative shoppers can individually and independently add items from at least one e-commerce site via a shopper-specific browser interface to the collaborative shared shopping cart. Any of the collaborative shoppers can select a sale finalization action via their browser interface. Responsive to the selection of the finalization action, each of the collaborative shoppers of the plurality can confirm whether that shopper elects to finalize a sale of the items in the collaborative shared shopping cart. Only when each of the collaborative shoppers has finalized the sale of items in the collaborative shopping cart, will a purchasing transaction commence. This action can purchase the items in the collaborative shared shopping cart from the e-commerce sites. A shared cart transactional discount can be provided for the purchase of the collaborative shared shopping cart items. This discount can be greater than or equal to a sum of transactional discounts that would have been granted where the collaborative shared shopping cart items purchased separately as individual specific discrete transactions. For the purchase, each of the different collaborative shoppers can pay a shopper specific amount for the items which that shopper placed in the collaborative shopping cart. The shopper specific amount will not exceed an amount that would have been paid where the items purchased separately by the shopper as an individual specific discrete transaction. Each of the purchased items can be shipped to postal/mail/other addresses specified by the different collaborative shoppers.

DETAILED DESCRIPTION

Figure 1:
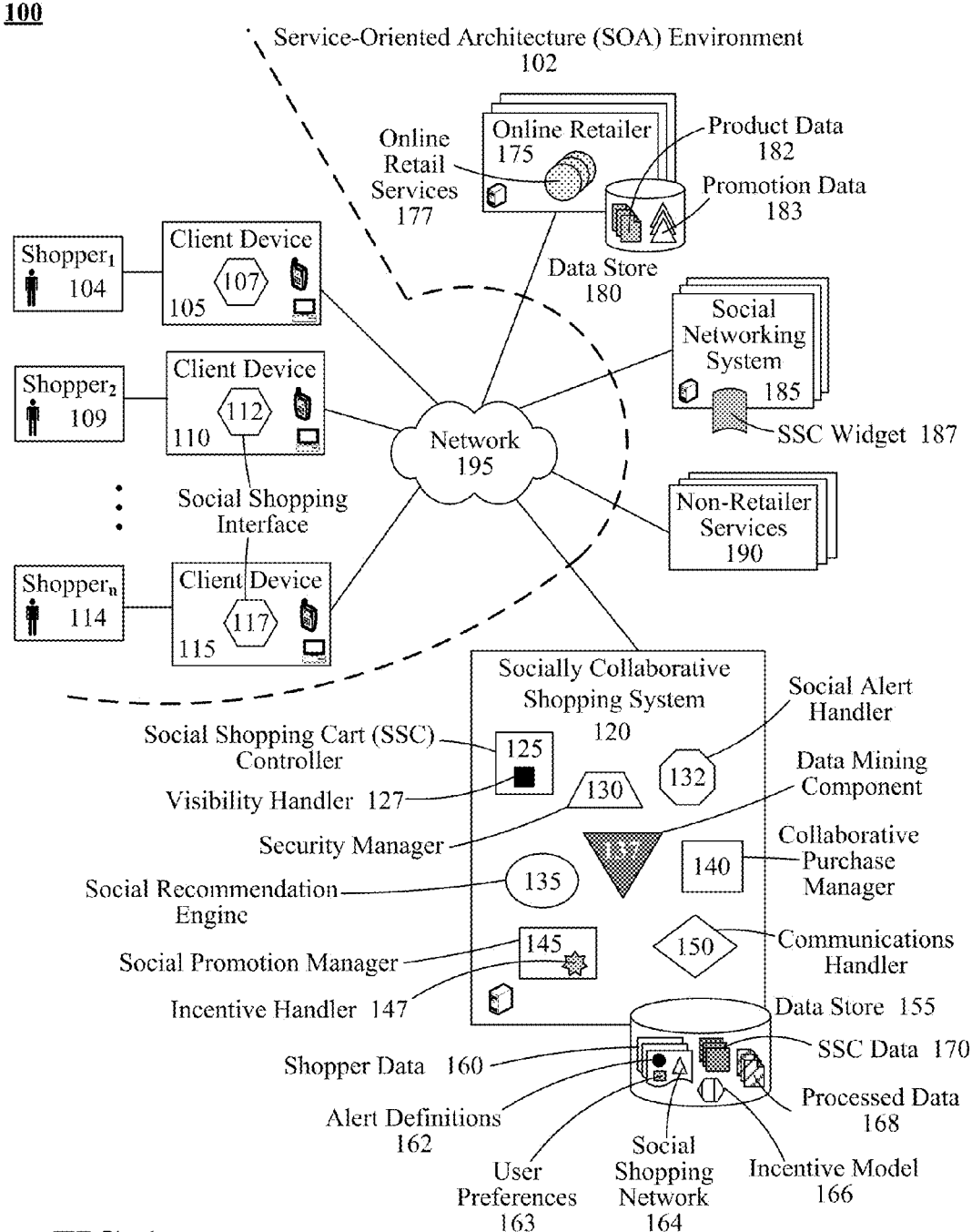
FIG. 1 is a schematic diagram illustrating a system that enables shoppers to make collaborative purchases from multiple online retailers participating in a socially collaborative shopping system in accordance with embodiments of the inventive arrangements disclosed herein.

The present invention discloses a solution that incorporates social relationships within the shopping experience provided by an online shopping system. A shopper can define a network of social relationships to other shoppers that the socially collaborative shopping system can utilize when providing the shopper with shopping-related information, such as recommendations and alert notifications. Multiple shoppers can create a shared social shopping cart (SSC) to make a collaborative purchase of their product items. The collaborative purchase of the SSC can be treated as a single logical transaction with the socially collaborative shopping system disseminating the purchase information to the specific online retailers involved. Further, online retailers can establish incentive models within the socially collaborative shopping system for rewarding shoppers who positively affect their sales.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction handling system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction handling system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which runs via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

FIG. 1 is a schematic diagram illustrating a system 100 that enables shoppers 104, 109, and 114 to make collaborative purchases from multiple online retailers 175 participating in a socially collaborative shopping system 120 in accordance with embodiments of the inventive arrangements disclosed herein. In system 100, shoppers 104, 109, and 114 can utilize a social shopping interface 107, 112, and 117 to share social shopping cart (SSC) data 170 over a network 195 to collectively make purchases from online retailers 175 associated with the socially collaborative shopping system 120.

Shoppers 104, 109, and 114 can access the social shopping interface 107, 112, and 117 from a client device 105, 110, and 115. The client device 105, 110, and 115 can represent a variety of computing devices, such as a personal computer or a network-enabled mobile phone. The social shopping interface 107, 112, and 117 can correspond to a software application that allows shoppers 104, 109, and 114 to perform a variety of operations within the socially collaborative shopping system 120 via network 195. The social shopping interface 107, 112, and 117 can utilize a variety of technologies capable of interacting with a service-oriented architecture (SOA) environment 102.

Examples of operations that can be performed by the shoppers 104, 109, and 114 can include, but are not limited to, a single shopper 104, 109, or 114 making purchases from one or more online retailers 175, multiple shoppers 104, 109, and 114 making a single collaborative purchase from one or more online retailers 175, defining a social shopping network 164 of other shoppers 104, 109, or 114, creating shopping alerts based on their social shopping network 164, and the like.

Use of the socially collaborative shopping system 120 can require a shopper 104, 109, and 114 to be registered. Registration of a shopper 104, 109, and 114 can include the collection and storage of shopper data 160. Shopper data 160 can represent information entered by a shopper 104, 109, and/or 114 that supports functions of the socially collaborative shopping system 120. Aside from standard identifying information (i.e., username and password), the shopper data 160 can also include alert definitions 162, user preferences 163, and a social shopping network 164.

Alert definitions 162 can represent a set of conditions that, when met, prompt the socially collaborative shopping system 120 to send a notification to the shoppers 104, 109, or 114. The user preferences 163 can represent user-configurable settings affecting how the socially collaborative shopping system 120 performs specific functions either for or in reference to the shoppers 104, 109, or 114.

In one embodiment, the alert definitions 162 can provide an ability to set up a passive mode listening for alerts from other shopping carts. For example, a shopper 104 may set up an alert (definitions 162) to buy a designated item, but this shopper 104 may not want to research for a good deal for that item. Shopper 104 can set up an alert on the item, where he/she receives an alert whenever someone else in his/her social shopping network 164 (e.g., shopper 109, shopper 114) finds a shopping deal for the designated item. Thus, one type of alert permits a deal to come to the shopper 104 rather than forcing the shopper 104 to find the deal.

The social shopping network 164 can represent a listing of other registered shoppers 104, 109, and/or 114 that a shopper 104, 109, or 114 has identified a relationship to, similar to a "friends" or "buddy" list. The social shopping network 164 can be configured to support a variety of information and/or relationships per the implementation of the socially collaborative shopping system 120.

The socially collaborative shopping system 120 can represent the hardware and/or software for a computing system capable of supporting the operations initiated within the social shopping interfaces 107, 112, and 117 by the shoppers 104, 109, and 114, and interacting with one or more online retailers 175, social networking systems 185, and/or non-retailer services 190 within a service-oriented architecture (SOA) environment 102. Using the SOA environment 102, the socially collaborative shopping system 120 can access online retail services 177 of its participating online retailers 175, interact with a SSC widget 187 supported by social networking systems 185, and exchange data with other non-retailer services 190.

The online retailers 175 can represent entities having Web-based systems for selling product items. An online retailer 175 can be a business that operates only electronically, such as a small business, or a business that maintains an electronic store in addition to physical stores. Online retail services 177 provided by online retailers 175 can include, but are not limited to, conventional shopping carts, inventory information, in-store availability of products, access to data 182 and 183 contained in an associated data store 180, and the like.

Online retailers 175 can include location based inventory retailers, who make their inventory available online. That is, advances in location awareness technologies and inventory management have permitted many physical storefront retailers to advertise their inventory online. In such a case, shoppers 104, 109, 114 can be notified when a person in their network 164 is close to a physical store that has an item in their SSC, so that that person can pick-up the item for the shopper 104, 109, 114 in question. When an item is picked up for a collaborator, the SSC of the person for whom the item is intended can be altered to prevent multiple inadvertent purchases of the same item. In one embodiment, updates can occur in real-time or near real-time. In one embodiment, this feature can be implemented using location awareness capabilities of mobile devices carried by people in the network 164.

The SSC widget 187 can represent a software component that can display SSCs and/or provide limited functionalities of the socially collaborative shopping system 120 within an interface of the social networking system 185 such as FACEBOOK, MYSPACE, or ORKUT. Members of the social networking system 185 using the SSC widget 187 need only have a social relationship with another member who is registered with the socially collaborative shopping system 120. For example, Member Y, who is not registered with the socially collaborative shopping system 120, can use the SSC widget 187 to view information about their friend, Member J, who is registered.

It should be appreciated that information sharing can be controlled by individual users in a network 164 (e.g., shopper 104, 109, 114) while required security and rules mechanisms are provided by the system 100. The system 100 provides an ability for retailers to extend their list of target shoppers 104, 109, 114 by not only focusing on existing customers, but also collaborators who are networked (via social shopping network 164) with existing customers.

In one embodiment, shoppers 104, 109, 114 can enable their SSC and their shopping history with their collaborators to be viewed by various independent retailers (online retailers 175). The amount of information that can be shared with retailers 175 can be configurable by a shopper 104, 109, 114 using access controls and other mechanisms. For example, using services provided by an external access control server, such as IBM TIVOLI DIRECTORY SERVER, the socially collaborative shopping system 120 can restrict access permissions.

For example, shopper 104 can use his/her SSC to purchase items from Retailer B's (retailer 175) Web site. Shopper 104 can then configure parameters of system 120 to allow Retailer B to access shopping purchases conducted by shopper 104 and his/her collaborators from other retailers 175. Based on this information, Retailer A can target those shoppers with specific promotions and products, thereby generating increased traffic and revenue from Retailer A's web site.

In one embodiment, targeted group promotions can be conducted by retailers 175 based on social shopping network 164 information. For example, specific promotions can be sent to encourage collaborative or joint shopping sessions between a defined set of individuals. These individuals can be selected based on the retailers 175 analysis from historic shopping transactions. For example, retailer 175 data can suggest that when shopper 104 and shopper 109 collaborate in a shopping session, each tends to make more substantial purchases than when either shops individually. Thus, a group promotion can be established to encourage these two shoppers 104 and 109 to shop together.

The non-retailer services 190 can represent a variety of other informational services available over the network 195 that are not associated with any specific online retailer 175. For example, the socially collaborative shopping system 120 can request review information for a product item from an independent reporting agency (i.e., consumer reports) to aggregate and present to a shopper 104, 109, and/or 114.

To support these various functions, components of the socially collaborative shopping system 120 can include a SSC controller 125, a security manager 130, a social alert handler 132, a social recommendation engine 135, a data mining component 137, a collaborative purchase manager 140, a social promotion manager 145, a communications handler 150, and a data store 155 for storing relevant data.

The communications handler 150 can represent the hardware and/or software components configured to manage the flow of both internal and external communications traffic. External elements, herein referred to en masse as "affiliated components", that communicate with the socially collaborative shopping system 120 can include, but are not limited to, client devices 105, 110, and 115, online retailers 175, social networking systems 185, non-retailer services 190 and the like. The communications handler 150 can be configured to support the necessary communications protocols as well as utilize pertinent application programming interfaces (APIs) to establish communication pathways with affiliated components 105, 110, 115, 175, 185, and 190.

The security manager 130 can represent the hardware and/or software elements of the socially collaborative shopping system 120 responsible for ensuring the digital security of data stored within the data store 155 and communications initiated by the communications handler 150. The security manager 130 can utilize a variety of available security technologies as supported by the socially collaborative shopping system 120, the network 195, and affiliated components 105, 110, 115, 175, 185, and 190.

The SSC controller 125 can represent the software component of the socially collaborative shopping system 120 that handles operations involving a shopper's 104, 109, and 114 social shopping carts (SSCs). A SSC created by the SSC controller 125 can be a modified universal shopping cart. In addition to supporting the one-to-many purchase relationship between a shopper 104, 109, or 114 and online retailers 175 of a conventional universal shopping cart, SSCs created by the SSC controller 125 can also support a many-to-many purchase relationship between shoppers 104, 109, and 114 and the online retailers 175, herein referred to as shared SSCs.

For example, shoppers 104, 109, and 114 can use a shared SSC to purchase product items for an upcoming party. Shopper$_1$ 104 can add decorations from one or more party supply retailers 175 to the shared SSC; shopper$_2$ 109 can add tableware from various housewares retailers 175; and shopper$_n$ 114 can add cookware from housewares and cookware boutiques 175.

Additionally, while shopping for cookware, shopper$_n$ 114 can find a better price at a different online retailer 175 for a product item previously added to the shared SSC by shopper$_2$ 109. Shopper$_n$ 114 can then replace the product item added by shopper$_2$ 109 with the same product item from the other online retailer 175 within the shared SSC.

The SSC controller 125 can be further configured to handle importing the contents of a conventional shopping cart from an online retailer 175 into a SSC structure. For example, a shopper$_1$ 104 can create/store a conventional shopping cart while shopping at the Web site of Store D, an online retailer 175 participating with the socially collaborative shopping system 120. Later, when visiting Store D 175 via the socially collaborative shopping system 120, the socially collaborative shopping system 120 can detect the existence of shopper$_1$'s 104 conventional shopping cart and can present shopper$_1$ 104 with the option to import the contents of that shopping cart into a new or existing SSC.

The SSC controller 125 can include a visibility handler 127 to ensure that shopping information (i.e., purchase histories, SSC contents) associated with a shopper 104, 109, and/or 114 are invisible or unavailable for use by specified entities. Limitations as to who can view which pieces or types of information can be stored within the user preferences 163 of the shopper's 104, 109, and/or 114 shopper data 160.

For example, shopper$_1$ 104, when purchasing a gift for shopper$_2$ 109, can indicate that shopper$_2$ 109 does not have permission to view the contents of a SSC named "gift" or only certain types of product items contained within any SSC. Thus, when shopper$_2$ 109 attempts to view all of the SSCs belonging to shopper$_1$ 104, the visibility handler 127 can omit the "gift" SSC from the listing.

Alternately, shopper$_2$ 109 can indicate that they do not wish to have purchase information about their SSCs "seen" by a specific online retailer 175; any purchase information collected by the socially collaborative shopping system 120 regarding shopper$_2$ 109 and the specific online retailer 175 would not be shared with the specific online retailer 175. The configuration of options for specifying these restrictions can be dependent upon the specific implementation and design of the socially collaborative shopping system 120.

The SSC controller 125 can also handle performance of additional user-selectable functions upon existing SSCs (shared or individual) that are currently unavailable in conventional online shopping systems. Examples of these functions can include, but are not limited to, copying another shopper's 104, 109, and/or 114 SSC, adding a product item to your SCC from another shopper's 104, 109, and/or 114 SSC or wish list, inviting another shopper 104, 109, or 114 to make a collaborative purchase of product items, and the like.

For example, shopper$_1$ 104 can view the wish list of shopper$_2$ 109 for gift ideas. Deciding upon a product item from the wish list, shopper$_1$ 104 can right-click on the product item in shopper$_2$'s 109 wish list and select an option to add the product item directly to their "gift" SSC. Since shopper$_1$ 104 is purchasing the product item from the wish list of shopper$_2$ 109, the product item can remain on shopper$_2$'s 109 wish list, not informing shopper$_2$ 109 that the product item has been bought.

It is important to remember that conventional online shopping systems, at most, allow shoppers 104, 109, and/or 114 the ability to view the shopping cart contents of other shoppers 104, 109, and/or 114. That is, in a conventional shopping system, a shopper 104, 109, and/or 114 may view, but cannot perform any operations upon the shopping cart of another.

Shoppers 104, 109, and 114 using a shared SSC to make a collaborative purchase need not be members of each others' social shopping networks 164. That is, the shoppers 104, 109, and 114 can simply desire to consolidate their purchases to take advantage of a promotion or increase their purchase power. For example, an online retailer 175 can offer a special discount for collaborative purchases made with a shared SSC that includes three or more shoppers 104, 109, and/or 114 purchasing their product items. Multiple shoppers 104, 109, and/or 114 purchasing product items from the online retailer 175 can indicate that they would like to consolidate their purchases with any other shoppers 104, 109, and/or 114 in order to receive the discount.

All the product items added to the shared SSC can be purchased by the shoppers 104, 109, and 114 as one logical transaction handled by the collaborative purchase manager 140 of the socially collaborative shopping system 120. That is, each shopper 104, 109, and 114 can initiate a single purchase transaction for their portion of the shared SSC within the socially collaborative shopping system 120. The collaborative purchase manager 140 can represent the software component configured to distribute the single purchase transaction made to the shared SSC to the corresponding online retailers 175. The distribution performed by the collaborative purchase manager 140 can occur transparent to the shoppers 104, 109, and 114.

The collaborative purchase manager 140 can be configured to separate the contents of the shared SSC by online retailer 175. A single purchase order can then be generated for each online retailer 175 that includes the billing and shipping information for each shopper 104, 109, and/or 114 having product items in the order. Since multiple shoppers 104, 109, and 114 can be involved with the single purchase order sent to each online retailer 175 by the collaborative purchase manager 140, the online retailers 175 participating in the socially collaborative shopping system 120 can be required to support order splitting. That is, each online retailer 175 can accept a purchase order where the product items are purchased by and shipped to different shoppers 104, 109, and/or 114.

Further, the treatment of the contents of a shared SSC as a single logical transaction can allow the collaborative purchase manager 140 to apply discounts or other special shopping promotions entered by any shopper 104, 109, and/or 114 to the contents of the shared SSC as a whole. That is, each shopper 104, 109, and 114 can receive the benefit of the discount or promotion for product items they added to the shared SSC that qualify.

Building upon the previous example, shopper$_2$ 109 can apply a coupon for a 10% price discount for all product items purchased from Store A 175 to the shared SSC. All product items from Store A 175 contained in the shared SSC, regardless of which shopper 104, 109, or 114 added the item, can have its price reduced by 10%.

The application of discounts and/or promotions to a shared SSC can be performed by the collaborative purchase manager 140 in real-time or near real-time, automatically reducing the purchase totals for each affected shopper 104, 109, and/or 114.

Functionality of the collaborative purchase manager 140 can be further expanded to provide shoppers 104, 109, and/or 114 with additional collaborative purchasing options. These additional collaborative purchasing options can include, but not limited to, allowing one shopper 104, 109, and/or 114 to pay for the entire shared SSC, allowing shoppers 104, 109, and/or 114 to pay a flat amount towards the total cost of the shared SSC, allowing shopper 104, 109, and/or 114 to pay for another shopper's 104, 109, and/or 114 potion of the shared SSC, allowing a shopper 104, 109, and/or 114 to purchase a product item in the shared SSC that was selected by another shopper 104, 109, and/or 114, and the like.

For example, parents can create a shared SSC with their son, who is attending college in another state. When it is time to pay for the product items contained in the shared SSC, the parents can select an option to pay for all the product items that were added to the shared SSC.

As shoppers 104, 109, and 114 conduct their shopping activities, other components 132, 135, and 145 of the socially collaborative shopping system 120 can activate to provide the shoppers 104, 109, and 114 with a variety of collaborative shopping-related information. The social alert handler 132 can represent the software component configured to send shoppers 104, 109, and 114 alert notifications when changes occur within the socially collaborative shopping system 120 that meet the conditions of their alert definitions 162 (e.g., a specific product item goes on sale).

Many conventional online shopping systems have incorporated the use of alert notifications between a shopper 104, 109, or 114 and an online retailers 175 (i.e., a shopper-retailer alert). The socially collaborative shopping system 120 can allow shoppers 104, 109, and 114 to create alert definitions 162 that include conditions based on their social shopping network 164 (i.e., a shopper-shopper alert). The means (e.g., text message, email, etc.) utilized by the social alert handler 132 to provide alert notifications can correspond to the capabilities of the communications handler 150.

For example, shopper$_1$ 104 can be a member of shopper$_2$'s 109 social shopping network 164. Shopper$_2$ 109 can then create an alert definition 162 requesting an alert whenever shopper$_1$ 104 creates a new SSC. Thus, whenever the social alert handler 132 detects or receives notification of shopper$_1$ 104 creating a new SSC, the social alert handler 132 can generate and present an alert message within the social shopping interface 112 of shopper$_2$ 109.

Throughout the shopping process, the social recommendation engine 135 can determine and present shoppers 104, 109, and 114 with a variety of product recommendations based upon the SSC data 170 of their SSCs, purchase history (not shown), social shopping networks 164, and the product data 183 from online retailers 175. Recommendation information provided by the social recommendation engine 135 can be presented in a variety of ways consistent with the implementation and design of the socially collaborative shopping system 120 and can be influenced by user-configurable settings within a shopper's 104, 109, and/or 114 user preferences 163.

For example, the social recommendation engine 135 can take the following information into account: shopper$_1$'s 104 previous purchase of Product Z from Store A 175, Product Z currently in a SSC (individual or shared) of shopper$_2$ 109 being purchased from Store D 175, shopper$_2$'s 109 inclusion in shopper$_1$'s 104 social shopping network 164, and a sale on Product Z at Store A 175. The social recommendation engine 135 can present both shoppers 104 and 109 with recommendations to purchase Product Z from Store A 175.

Further, the social recommendation engine 135 can be configured to provide shoppers 104, 109, and 114 associated with a shared SSC with recommendations based on commonalities between the shoppers 104, 109, and 114 and contents of the shared SSC.

In one embodiment, shoppers 104, 109, 114 responsive for increased retailer 175 sales (such as via recommendations) can receive incentives. Responsibility for sales can be tracked through click through analysis. For example, a shopper 104, 109, 114 looking through a SSC of another can notice that the collaborator has purchased a product and recommends it. The shopper 104, 109, 114 therefore adds the product to his SSC and purchases it. The retailer 175 can reward the collaborator who had originally purchased the product. This idea can be extended so that incentives are provided even if the item is added to a SSC, but not purchased.

In one implementation, the following actions can be tracked for incentive purposes: a shopper 104, 109, 114 adding an item to a cart because of viewing the item in an influencer's cart; tracking whether the added item is converted to purchase; and tracking all the responsible users who helped the buyer reach the influencer's cart. Any of a variety of incentive models can be used, which include models based on game theory and mechanism design. Some game theoretic models can include, but are not limited to, network incentive (Amway model), cost sharing mechanism, and marginal contribution (Shapley value).

In another contemplated embodiment, the social recommendation engine 135 can request recommendation information about a specific shopper 104, 109, or 114 and/or product item from corresponding online retailers 175; an online retail service 177 of the online retailers 175 can provide the recommendation information. The social recommendation engine 135 can then aggregate the recommendation information from the various online retailers 175 to present to the shopper 104, 109, or 114.

The social recommendation engine 135 can also be configured to utilize information received from non-retailer services 190. For example, a shopper 104, 109, or 114 can set user preferences 163 to have the social recommendation engine 135 utilize ratings from an independent testing laboratory 190 when determining products to recommend.

While the social recommendation engine 135 provides recommendations of product items to purchase, the social promotion manager 145 can make a shopper 104, 109, or 114 aware of discounts and deals available for their SSCs (individual or shared). The social promotion manager 145 can determine potential promotions using the promotion data 183 of online retailers 175 and shopping data 160 and 170 related to the shopper 104, 109, or 114. Promotions identified by the social promotion manager 145 can encompass multiple online retailers 175 and/or shoppers 104, 109, and 114.

For example, a shopper 104, 109, or 114 having Product Z in a stored SSC can be presented with all the promotions currently available for Product Z from all applicable online retailers 175 by the social promotion manager 145. Examples of promotions can include, but are not limited to, a buy-one-get-one-free offer, discounted shipping prices for orders of a specific value, a clearance discount, a bulk order discount, a returning customer discount, and the like.

Further, the social promotion manager 145 can work with the social recommendation engine 135 to provide shoppers 104, 109, and 114 with recommendations based on promotion data 183, such as online retailers 175 having additional benefits when purchases are made from them as a group. For example, Store A 175 and Store D 175 can have a promotion expressed in their promotion data 183 indicating that a SSC containing purchases from both online retailers 175 receives free shipping. The social promotion manager 145 can identify this promotion for $shopper_1$ 104 who's SCC contains product items from Store A 175. This information can be passed to the social recommendation engine 135 that can then send $shopper_1$ 104 a recommendation to purchase a product item from Store D 175 with their SCC to receive free shipping.

In addition to these various shopper-centric functions, components of the socially collaborative shopping system 120 can also be configured to provide online retailers 175 with the means to institute additional business models and features tailored to collaborative purchases and the social relationships contained in shoppers' 104, 109, and 114 social shopping networks 164. Components supporting these functions can include the data mining component 137, the social alert handler 132, the social recommendation engine 135, and the social promotion manager 145.

The data mining component 137 can represent the software component of the socially collaborative shopping system 120 configured to collect raw data regarding shopping-related activities (e.g., product purchases, product viewings) performed by the shoppers 104, 109, and 114. The data mining component 137 can then synthesize the raw data into processed data 168 stored within the data store 155. The processed data 168 can be provided to the corresponding online retailers 175 and/or non-retailer services 190.

Since the raw data collected by the data mining component 137 can include collaborative purchases made between shoppers 104, 109, and 114, the processed data 168 can carry forth the relationships between shoppers 104, 109, and/or 114. For example, instead of simply stating that shoppers 104 and 109 each purchased Product Z, the processed data 168 can capture that $shopper_1$ 104 made a purchase of Product Z, $shopper_2$ 109 purchased Product Z from $shopper_1$'s 104 SSC, and $shopper_2$ 109 is not a member of $shopper_1$'s 104 social shopping network 164. Thus, the processed data 168 generated by the socially collaborative shopping system 120 can provide online retailers 175 with a level of detail currently not available in conventional online shopping systems.

The detailed capture of shopper 104, 109, and 114 information within the processed data 168 can allow online retailers 175 to expand their consumer base to shoppers 104, 109, and/or 114 contained in the social shopping networks 164 of returning shoppers 104, 109, or 114. This can allow the online retailers 175 to target these related shoppers 104, 109, and/or 114 with special promotions.

Online retailers 175 can also utilize the processed data 168 to define incentive models 166 that reward shoppers 104, 109, and/or 114 whose actions within the socially collaborative shopping system 120 generate positively affect the online retailer 175, such as increasing product sales or product viewings or provide detailed product reviews or feedback. The social promotion manager 145 can include an incentive handler 147 configured to analyze the processed data 168 in terms of the reward conditions of the incentive models 166 for each shopper 104, 109, and 114.

In one example of an incentive/reward structure, the incentive model 166 of Store A 175 can define quantities of reward points that can be added to a shoppers 104, 109, and/or 114 account with the socially collaborative shopping system 120 and/or Store A 175 in response to actions performed by other shoppers 109 and/or 114. For example, $shopper_2$ 109 views (i.e., clicks on, hovers over) information about Product Z, which is being purchased from Store A 175, from a SSC belonging to $shopper_1$ 104. The incentive handler 147 can recognize this action within the incentive model 166 and provide $shopper_1$ 104 with the specified quantity of reward points. Should $shopper_2$ 109 perform any other shopping actions related to Store A 175 and/or Product Z that are defined within the incentive model 166 (e.g., purchasing Product Z from Store A 175, adding Product Z to their SSC, etc.), the incentive handler 147 can further increase shopper$_1$'s 104 amount of reward points.

It should be noted that this is a simple example of an incentive/reward structure and that the incentive models 166 utilized within the socially collaborative shopping system 120 can depend upon the design and the implementation details of the socially collaborative shopping system 120 as well as the design of the incentive model 166 of the online retailer 175.

Rewards earned or near to being earned by a shopper 104, 109, or 114 can be passed from the incentive handler 147 to the social promotion manager 145 for presentation within the social shopping interface 107, 112, or 117. Shoppers 104, 109, and/or 114 can then take the necessary actions to redeem/use an earned reward or earn a reward that they are close to earning. Examples of rewards earned by shoppers 104, 109, and 114 can include, but are not limited to, coupon codes, free/discounted product items, gift items, free/discounted shipping rates, early access to sale-priced items, and the like.

For example, the incentive handler 147, correlating processed data 168 pertaining to shopper$_1$ 104 and the incentive model 166 of Store Z 175, can inform shopper$_1$ 104 that they have earned a coupon code for 10% off their next purchase from Store Z 175. Further, shopper$_1$ 104 can be told that they will receive a coupon for 15% off should five members of their social shopping network 164 purchase products recommended by or contained within a SSC of shopper$_1$ 104.

The incentive handler 147 can be configured to provide reward information to shoppers 104, 109, and 114 at a time period predefined (i.e., daily, weekly, etc.) within the socially collaborative shopping system 120. The incentive models 166 provided by the online retailers 175 can conform to standards established by the socially collaborative shopping system 120.

The concept of collaborative purchases can lead to multiple online retailers 175 providing shoppers 104, 109, and 114 with sales structures or discounts for bulk/group purchases from one online retailer 175 or specific set of online retailers 175. For example, promotion data 183 for Store D 175 can indicate that a purchase of four Product Zs qualifies for a 5% discount that can be increased by 2% for every Product Z above four purchased. In another example, a shopper 104, 109, and 114 can receive a 10% discount when a television is purchased from Store A 175 and a recliner is purchased from Store D 175.

The role of the social alert handler 132 can also be further expanded to provide additional benefit in the form of alert notifications between online retailers 175 (i.e., a retailer-retailer alert). This increased functionality can require the online retailer 175 to create a set of alert definitions (not shown) within the data store 155 of the socially collaborative shopping system 120. For example, Store A 175 can receive alert notifications when a changes in price occurs for common product items sold by Store D 175.

The socially collaborative shopping system 120 can also include other typical functions found in conventional online shopping systems, such as wish lists, user-entered product recommendations, product item feedback, product item ratings, surveys, and the like. The configuration of the components of the socially collaborative shopping system 120 previously detailed can be extended to utilize these typical data sources without significant deviation from this embodiment of the present invention.

In another embodiment, the socially collaborative shopping system 120 can be implemented as a distributed computing system. In yet another embodiment, the socially collaborative shopping system 120 can incorporate the location awareness capability of mobile devices. For example, a shopper 104, 109, or 114 can receive an alert when a shopper 104, 109, or 114 in their social shopping network 164 is in or near to a physical store corresponding to an online retailer 175 that they desire to make a purchase from. The alerted shopper 104, 109, or 114 can then contact the mobile device of the other shopper 104, 109, or 114 to ask them to make an in-store pick up of the product item.

Network 195 can include any hardware/software/and firmware necessary to convey data encoded within carrier waves. Data can be contained within analog or digital signals and conveyed though data or voice channels. Network 195 can include local components and data pathways necessary for communications to be exchanged among computing device components and between integrated device components and peripheral devices. Network 195 can also include network equipment, such as routers, data lines, hubs, and intermediary servers which together form a data network, such as the Internet. Network 195 can also include circuit-based communication components and mobile communication components, such as telephony switches, modems, cellular communication towers, and the like. Network 195 can include line based and/or wireless communication pathways.

As used herein, presented data stores 155 and 180 can be a physical or virtual storage space configured to store digital information. Data stores 155 and 180 can be physically implemented within any type of hardware including, but not limited to, a magnetic disk, an optical disk, a semiconductor memory, a digitally encoded plastic memory, a holographic memory, or any other recording medium. Data stores 155 and 180 can be a stand-alone storage unit as well as a storage unit formed from a plurality of physical devices. Additionally, information can be stored within data stores 155 and 180 in a variety of manners. For example, information can be stored within a database structure or can be stored within one or more files of a file storage system, where each file may or may not be indexed for information searching purposes. Further, data stores 155 and 180 can utilize one or more encryption mechanisms to protect stored information from unauthorized access.

It should be appreciated that system 100 represents one contemplated, non-limiting, architecture for the disclosure and that others are contemplated. For example, in one embodiment, functionality of the social networking system specific to collaborative shopping can be directly incorporated into online retail services 177 and need not be implemented into a separate social networking system 185. Likewise, functionality (or portions thereof) of the socially collaborative shopping system 120 can be incorporated directly into the social networking system 185, as a new service of the social networking system 185. Specific artifacts, such as the SSC widget 187, for interacting among the indicated components can (and are expected to vary) in accordance with different implementation choices, which are to be considered within scope of the disclosure.

Additionally, in one contemplated embodiment, the services provided by the socially collaborative shopping system 120 can be conducted transparently to the online retailers 175 and/or social networking system 185. For example, system 120 can establish a single "virtual shopper" which is a user of system 175 and/or 185, which behaves as if it is a single individual, thus resulting in a unified shopping experience.

The system 120 can perform the "splitting" actions needed to allocate the contributions to the various shoppers 104, 109, 114 that have been combined as the virtual shopper. This can include combining payments for a "single" purchase of the "virtual shopper", allocating rewards from the shopping, etc. In this manner, the system 100 improvements can be implemented in any unmodified system (175, 185), yet still provide the collaborative shopping functionality (or portions thereof) as detailed herein.

It is possible that a subset of normally permitted functionality will be present when interacting with legacy systems. For example, rewards offered for shopping may be attributed to the "virtual shopper," which system 120 will allocate to the shoppers 104, 109, 114 in accordance with established rules. Thus, the rewards of the virtual shopper may not be unified with individual shopper's reward programs, since the online retainer 175 may not support combining rewards (which would be supported in an embodiment where online retailer 175 is aware of and participates in collaborative shopping via system 120).

Figure 2:
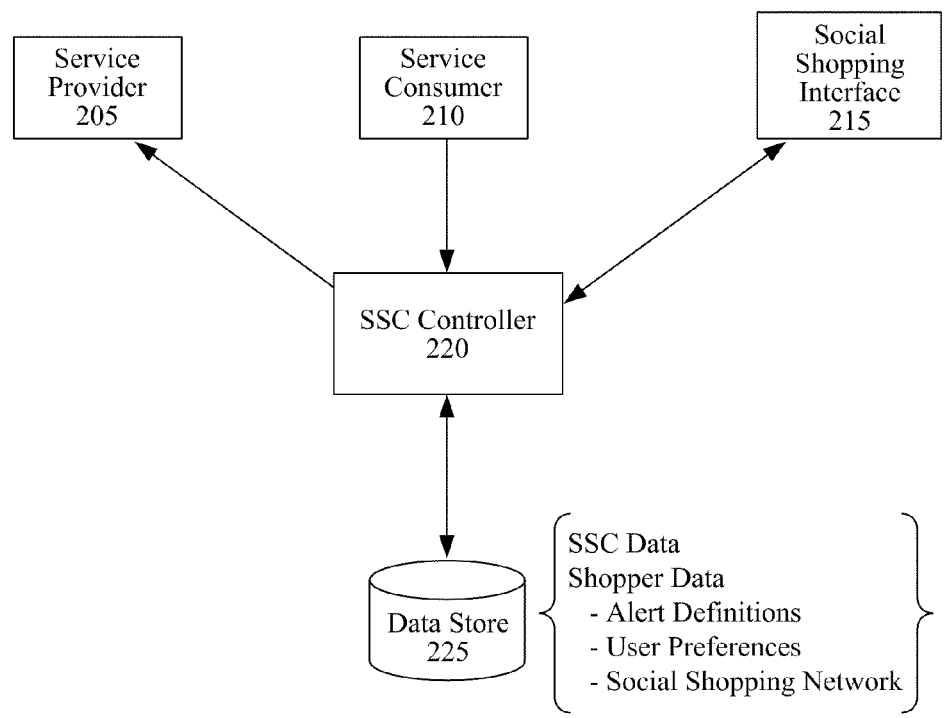
FIG. 2 is a block diagram illustrating the basic data flows involving the SSC controller in accordance with an embodiment of the inventive arrangements disclosed herein.

FIG. 2 is a block diagram 200 illustrating the basic data flows involving the SSC controller 220 in accordance with embodiments of the inventive arrangements disclosed herein. Block diagram 200 can be utilized within the context of system 100 or any other online shopping system that utilizes a social network structure and supports operation in a SOA environment.

As shown in diagram 200, the SSC controller 220 can provide data to various service providers 205 such as other shoppers or internal components of the socially collaborative shopping system. The SSC controller 220 can receive data from service consumers 210, such as the non-retailer services 190 or online retailers 175 of system 100. Service consumers 210 can also represent other internal components of the socially collaborative shopping system, such as updates to purchase totals calculated by the collaborative purchase manager.

Data can be bi-directionally communicated with the social shopping interface 215 and data store 225. Functions affecting SSCs invoked by shoppers via the social shopping interface 215 can be sent to the SSC controller 220, which can return the resultant information to the social shopping interface 215.

The SSC controller 220 can request data from as well as save data to the data store 225. Requested data can be conveyed from the data store 225 to the SSC controller 220, which can then send the data to other components such as the social shopping interface 215.

Figure 3:
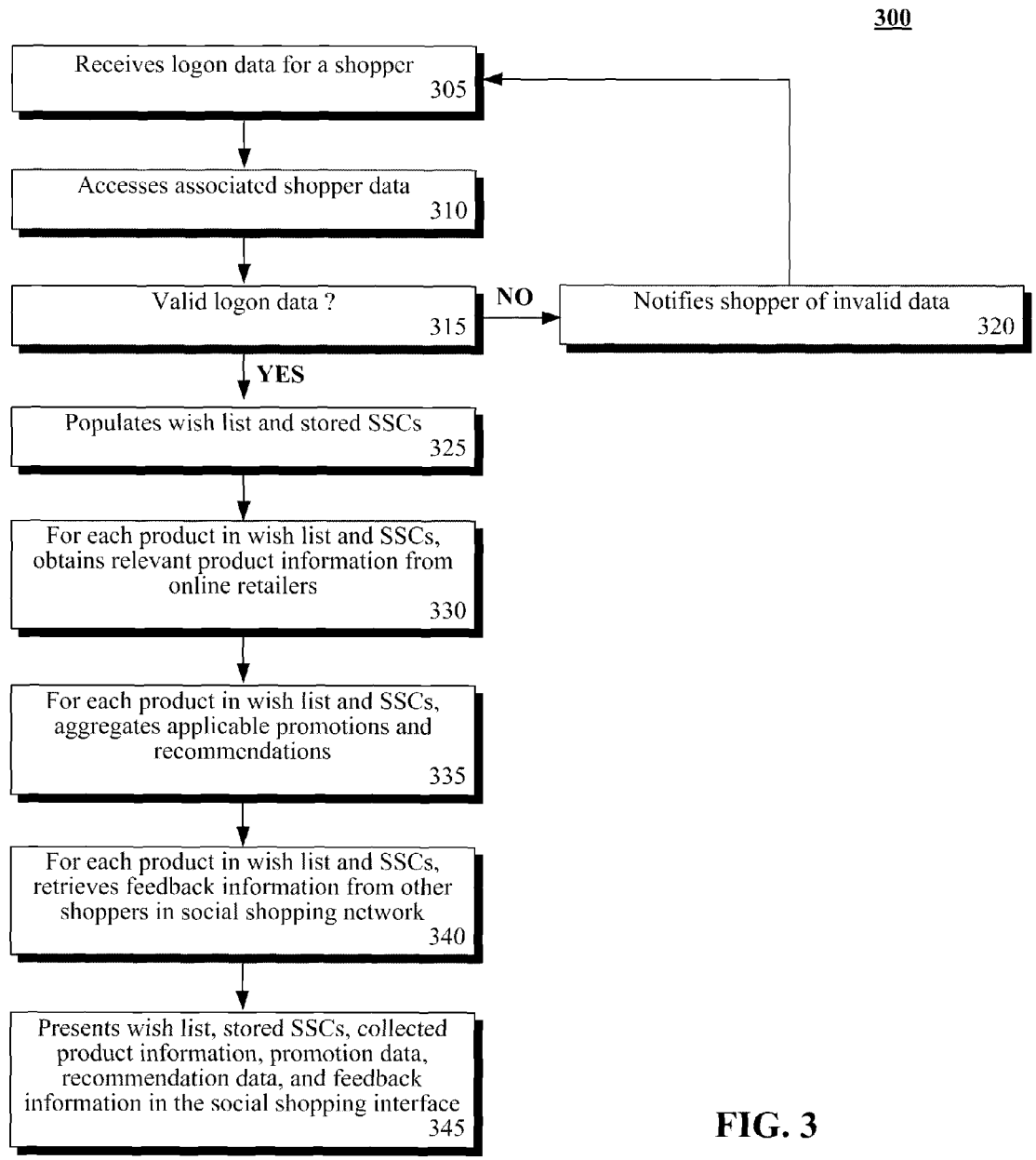
FIG. 3 is a flow chart of a method describing the initial aggregation of data for presentation to a shopper within the social shopping interface of a socially collaborative shopping system in accordance with an embodiment of the inventive arrangements disclosed herein.

FIG. 3 is a flow chart of a method 300 describing the initial aggregation of data for presentation to a shopper within the social shopping interface of a socially collaborative shopping system in accordance with embodiments of the inventive arrangements disclosed herein. Method 300 can be performed within the context of system 100 and/or utilizing the communication flow of block diagram 200.

Method 300 can begin in step 305 where the socially collaborative shopping system can receive the logon data for a shopper. The stored shopper data associated with the shopper's logon data can be access in step 310. In step 315, the validity of the logon data can be determined.

When the logon data is invalid, step 320 can be performed where the shopper is notified of the invalid data. Flow of method 300 can return to step 305 from step 320 to await the re-entry of logon data. When the logon data is valid, the product items for the shopper's wish list (if applicable) and any stored SSCs can be populated in step 325.

In step 330, the relevant information for each product item contained in the shopper's wish list and/or SSCs can be obtained from the originating online retailers. Promotions and recommendations applicable to the product items contained in the shopper's wish list and/or SSCs can be aggregated in step 335.

In step 340, feedback information from other shoppers contained in the social shopping network of the shopper logging on can be retrieved. Presentation of the shopper's wish list and/or SSCs and the data collected in the previous steps 330-340 within the social shopping interface can occur in step 345.

Figure 4:
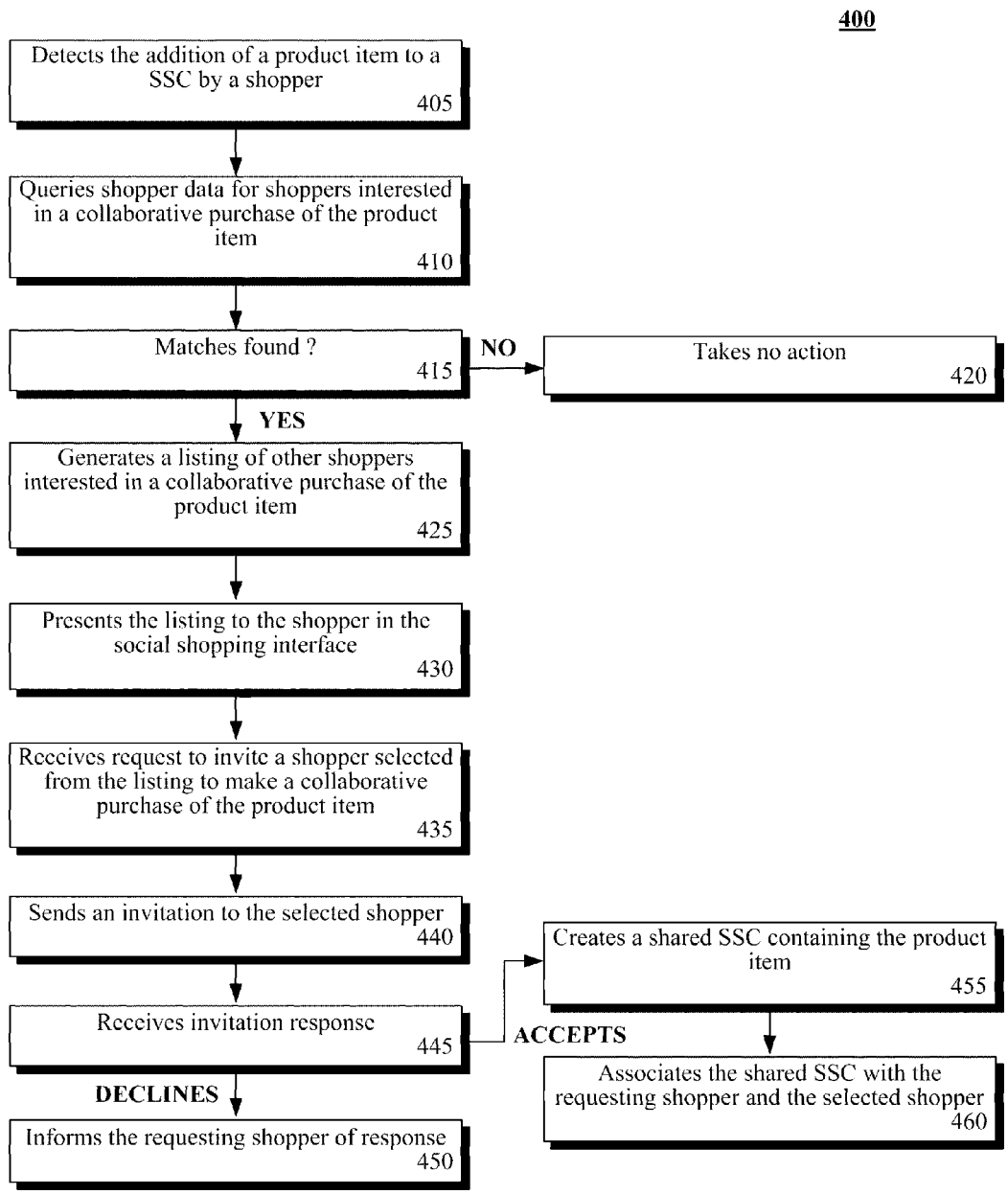
FIG. 4 is a flow chart of a method describing the creation of a shared SSC within socially collaborative shopping system in accordance with embodiments of the inventive arrangements disclosed herein.

FIG. 4 is a flow chart of a method 400 describing the creation of a shared SSC within socially collaborative shopping system in accordance with embodiments of the inventive arrangements disclosed herein. Method 400 can be performed within the context of system 100 and/or utilizing the communication flow of block diagram 200.

Method 400 can begin in step 405 where the socially collaborative shopping system can detect the addition of a product item to a SCC by a shopper. Shopper data can be queried for shoppers who are interested in a collaborative purchase of the product item in step 410. In step 415, it can be determined if matches to the query of step 410 were found.

When no other shoppers are interested in a collaborative purchase of the product item, step 420 can be performed where the socially collaborative shopping system takes no action. When there are other shoppers interested in making a collaborative purchase of the product item, a listing of these other shoppers can be generated in step 425.

The listing can be presented to the shopper within the social shopping interface in step 430. In step 435, the socially collaborative shopping system can receive a request from the shopper to invite a shopper selected from the listing to make a collaborative purchase of the product item.

The socially collaborative shopping system can sent an invitation to the shopper selected from the listing in step 440. In step 445, a response to the invitation can be received from the selected shopper.

When the received response indicates that the selected shopper declines the invitation, step 450 can be performed where the socially collaborative shopping system informs the requesting shopper of the response. When the selected shopper accepts the invitation, the socially collaborative shopping system can create a shared SSC containing the product item in step 455. In step 460, the requesting shopper and the selected shopper can be associated with the shared SSC.

Figure 5:
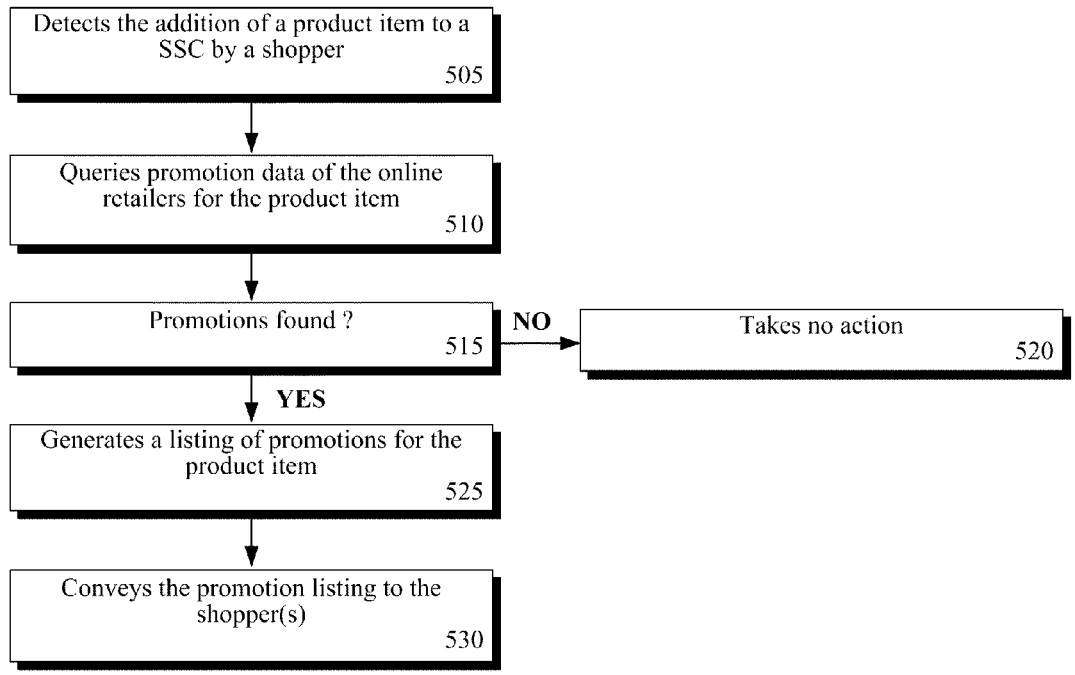
FIG. 5 is a flow chart of a method describing the handling of promotions by a socially collaborative shopping system in accordance with embodiments of the inventive arrangements disclosed herein.

FIG. 5 is a flow chart of a method 500 describing the handling of promotions by a socially collaborative shopping system in accordance with embodiments of the inventive arrangements disclosed herein. Method 500 can be performed within the context of system 100 and/or utilizing the communication flow of block diagram 200.

Method 500 can begin in step 505 where the socially collaborative shopping system can detect the addition of a product item to a SSC (individual or shared) by a shopper. The promotion data of the online retailers can be queried for the product item in step 510.

The existence of promotions from the online retailer for the product item can be determined in step 515. When no promotions are found, the socially collaborative shopping system can take no action in step 520.

When promotions exist, step 525 can be performed where a listing of promotion can be generated for the product item. The promotion listing can be conveyed to the shopper (or shoppers in the case of a shared SSC) in step 530.

Figure 6:
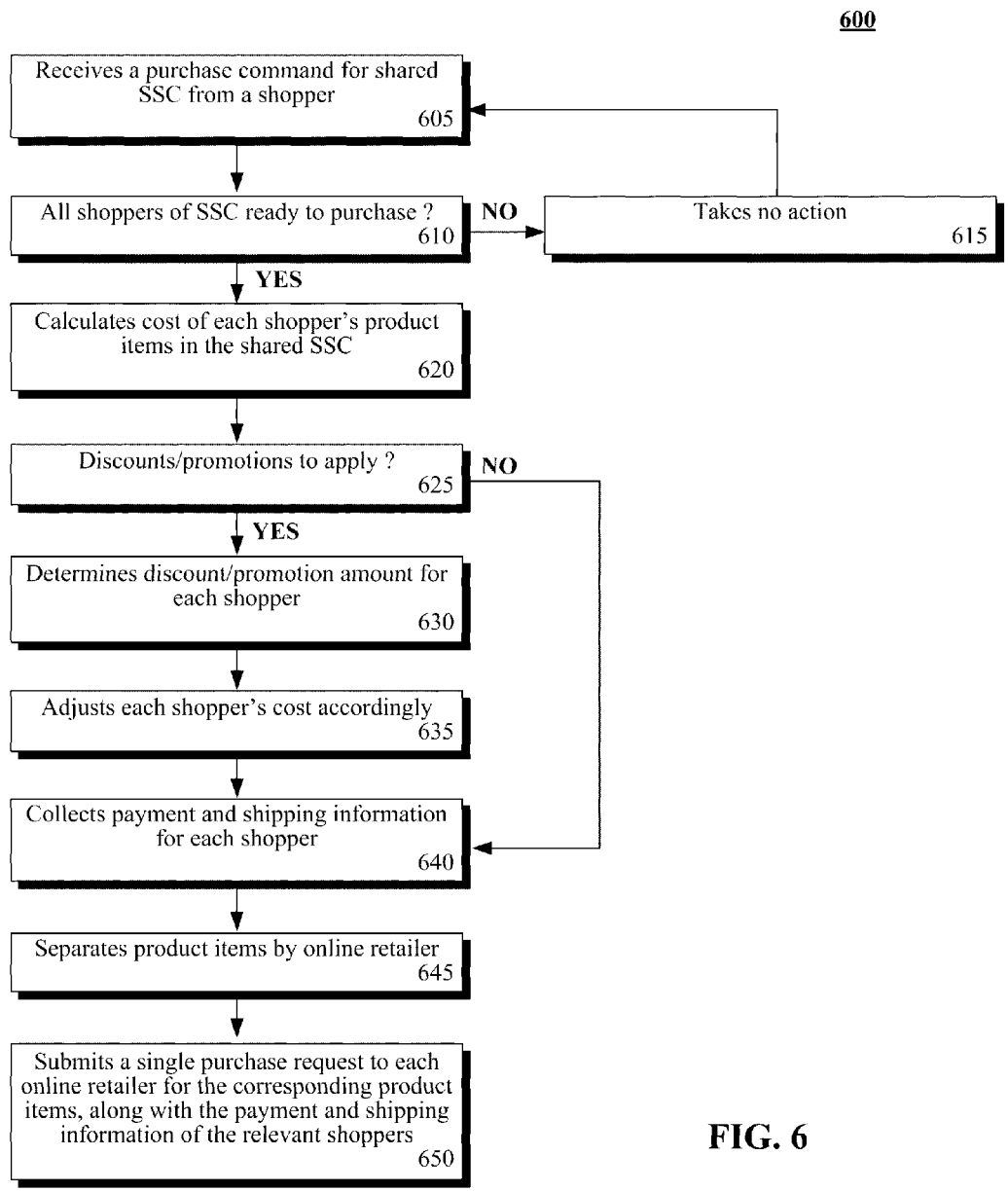
FIG. 6 is a flow chart of a method describing performance of a collaborative purchase by a socially collaborative shopping system in accordance with embodiments of the inventive arrangements disclosed herein.

FIG. 6 is a flow chart of a method 600 describing performance of a collaborative purchase by a socially collaborative shopping system in accordance with embodiments of the inventive arrangements disclosed herein. Method 600 can be performed within the context of system 100 and/or utilizing the communication flow of block diagram 200.

Method 600 can begin in step 605 where the socially collaborative shopping system can receive a purchase command for a shared SSC from a shopper. In step 610, it can be determined if all the shoppers associated with the shared SSC are ready to conduct the purchase.

When one or more shoppers are not ready to conduct the purchase, the socially collaborative shopping system can take no action in step 615. Flow of method 600 can then return to step 605 to await the next purchase command for the shared SSC.

In step 620, the cost of each shopper's products items in the shared SSC can be calculated. It can be determined if any discounts and/or promotions have applied to the shared SSC in step 625.

When a discount/promotion has bee applied to the shared SSC, step 630 can be performed where the amount of the discount/promotion can be determined for each shopper. Each shopper's cost, as calculated in step 620, can be adjusted by the determined amount in step 635.

Upon completion of step 635 or when no discounts/promotions have been applied to the shared SSC, step 640 can be performed where the payment and shipping information can be collected for each shopper. The product items contained in the shared SSC can then be separated by online retailer in step 645. In step 650, a single purchase request can be submitted to each online retailer along with the payment and shipping information of the shoppers purchasing the product items.

Figure 7:
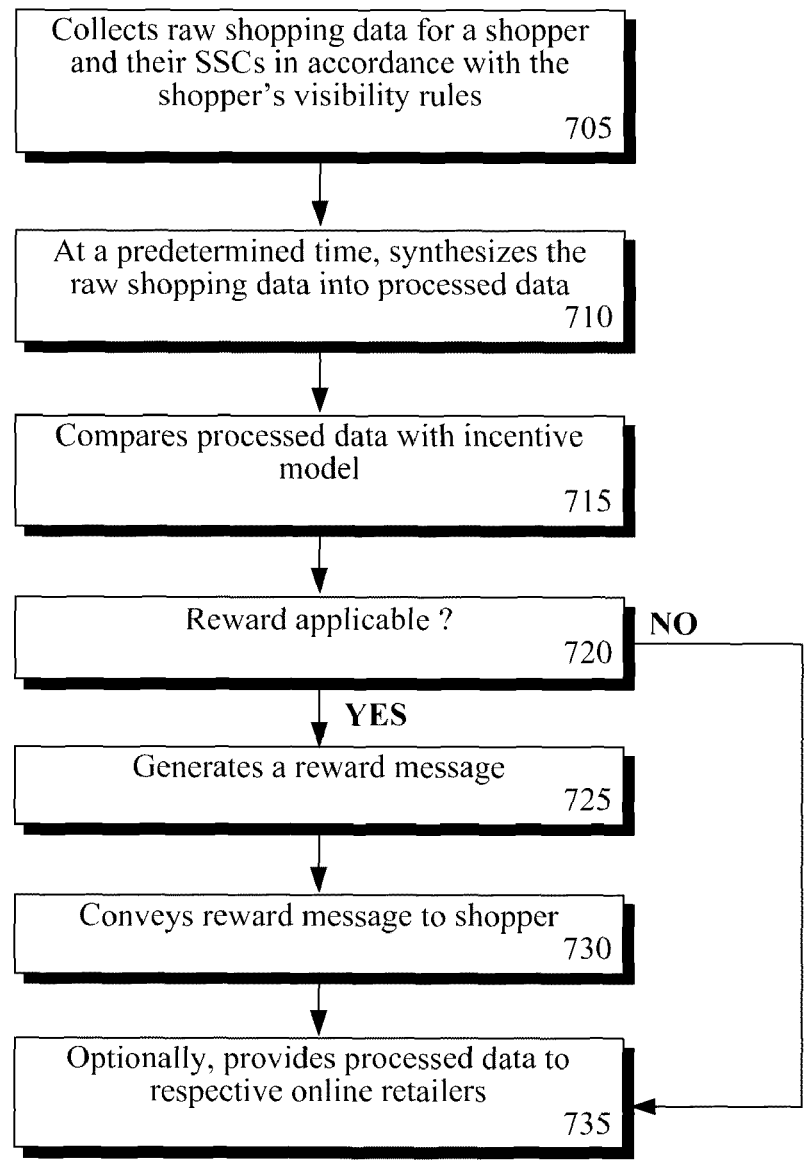
FIG. 7 is a flow chart of a method describing the handling of incentives within a socially collaborative shopping system in accordance with embodiments of the inventive arrangements disclosed herein.

FIG. 7 is a flow chart of a method 700 describing the handling of incentives within a socially collaborative shopping system in accordance with embodiments of the inventive arrangements disclosed herein. Method 700 can be performed within the context of system 100 and/or utilizing the communication flow of block diagram 200.

Method 700 can begin in step 705 where the socially collaborative shopping system can collect raw shopping data for a shopper and their SSCs in accordance with the shopper's visibility rules. At a predetermined time, the raw shopping data can be synthesized into processed data in step 710.

In step 715, the processed data can be compared with applicable incentive models. Applicable rewards for the shopper can be determined in step 720. When a reward is applicable for the shopper, the socially collaborative shopping system can generate a reward message in step 725.

In step 730, the reward message can be conveyed to the shopper. Upon completion of step 730 or when no rewards are applicable to the shopper, the processed data can be optionally provided to the respectively online retailers in step 735.

Figure 8:
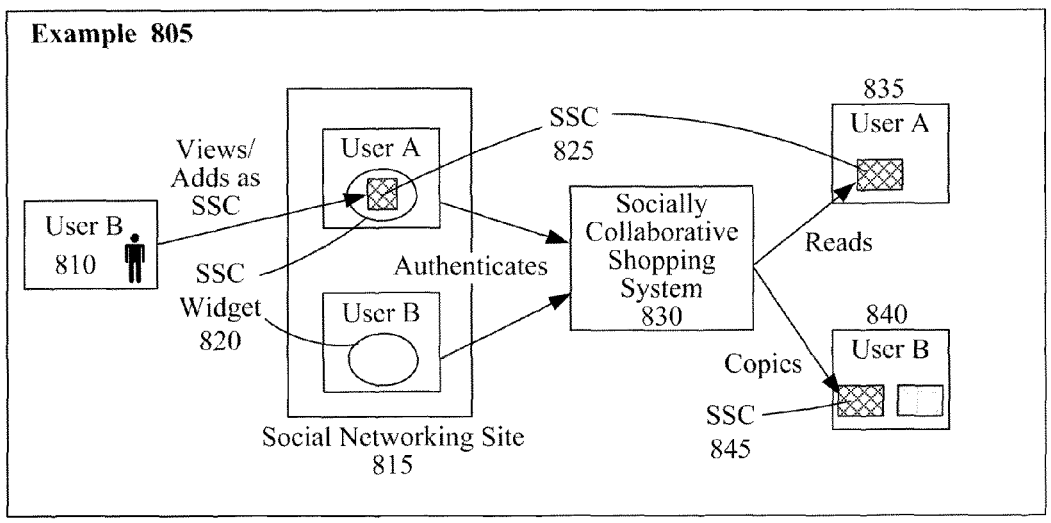
FIG. 8 is a collection of examples illustrating the interaction of the socially collaborative shopping system with a social networking site in accordance with embodiments of the inventive arrangements disclosed herein.
Figure 8:
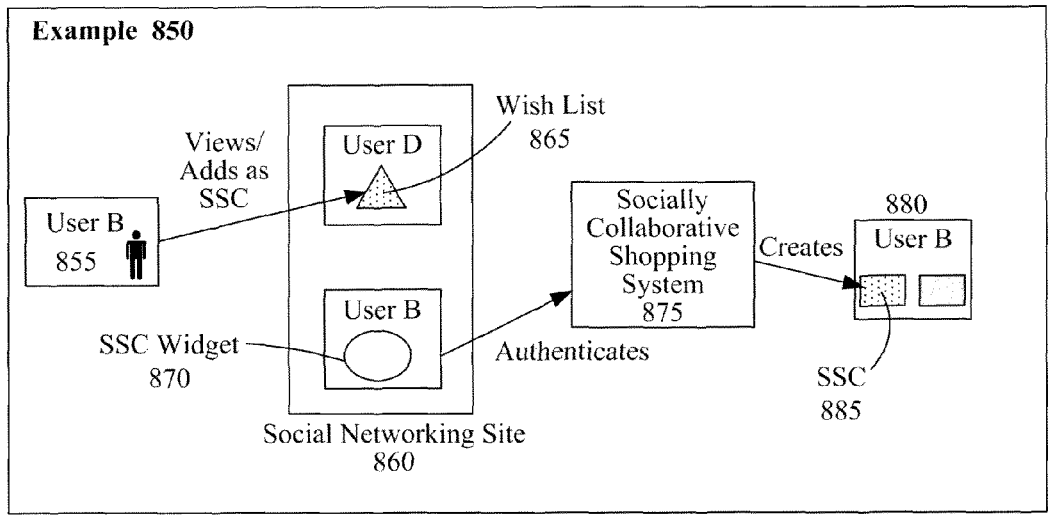

FIG. 8 is a collection 800 of examples 805 and 850 illustrating the interaction of the socially collaborative shopping system 830 and 875 with a social networking site 815 and 860 in accordance with embodiments of the inventive arrangements disclosed herein. The examples 805 and 850 of collection 800 can be performed within the context of system 100 and/or utilizing the communication flow of block diagram 200.

In example 805, User B 810 can utilize a social networking site 815 to view the SSC 825 of User A via the SSC widget 820. User B 810 can select an option from the SSC widget 820 to add User A's SSC 825 to their account 840 within the socially collaborative shopping system 830.

The social networking site 815 can authenticate both User A and User B 810 to the socially collaborative shopping system 830. The socially collaborative shopping system 830 can then read the SSC 825 contained within User A's account 835 and copy the SSC 825 as a new SSC 845 in User B's 810 account 840.

It should be noted that, in example 805, both User B and User A are members of the socially collaborative shopping system 830.

In example 850, User B 855 can view the wish list 865 of User D within the social networking site 860. User B 855 can utilize a function of the SSC widget 870 add User D's wish list 865 as a SSC 885 in their account 880 of the socially collaborative shopping system 875.

The social networking site 860 can automatically authenticate User B 855 to the socially collaborative shopping system 875. The socially collaborative shopping system 875 can then create a new SSC 885 within User B's 855 account 880 that contains the products listed in the wish list 865 of User D.

The socially collaborative shopping system 875 can handle incompatible online retailers and/or product items from the wish list 865 in accordance with predefined rules governing operation of the socially collaborative shopping system 875.

It should be noted that, in example 850, only User B 855 is a member of the socially collaborative shopping system 875.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A collaborative e-shopping method comprising:
    establishing, using a computer processor, a shared shopping cart for use by a plurality of different collaborative shoppers;
    each of said collaborative shoppers individually and independently adding items from at least one e-commerce site via a shopper-specific browser interface to the shared shopping cart;
    each of said collaborative shoppers specifying a purchasing leeway for each of the items, wherein each purchasing leeway includes a deviation extent from specifics of the respective item added to the shared shopping cart;
    determining a transactional discount, wherein the discount is greater than a sum of transactional discounts that would have been applied if the shared shopping cart items were purchased separately as individual-specific discrete transactions;
    disproportionately allocating the transactional discount to each collaborative shopper so that collaborative shop- pers with a greater purchasing leeway receive a higher portion of the discount than collaborative shoppers with a lesser purchasing leeway;

at least one of said collaborative shoppers selecting a sale finalization action via their browser interface;

responsive to the selection of the sale finalization action, confirming that each of the collaborative shoppers of the plurality elect to finalize a sale of the items in the shared shopping cart;

in response to each of said collaborative shoppers finalizing the sale of the items in the shared shopping cart, purchasing the items in the shared shopping cart from the at least one e-commerce site; and shipping each of the purchased items of the shared shopping cart to addresses specified by the different collaborative shoppers.

2. The method of claim 1, further comprising:

for the purchase, each of the different collaborative shoppers paying a shopper specific amount for the items which that shopper placed in the shared shopping cart, wherein said shopper specific amount does not exceed an amount that would have been paid where the items purchased separately by the shopper as an individual-specific discrete transaction.

3. The method of claim 1, wherein said shared cart transactional discount comprises a bulk quantity discount, a shipping discount, a reward program discount, and a combination item purchasing discount, some of which would not have been available to the different collaborative shoppers outside the shared shopping cart purchase.

4. The method of claim 1, wherein the adding of items by at least one of the collaborative shoppers occurs at different times from different locations and using different user interfaces which each individual one of the different collaborative shoppers must log onto using shopper-specific authorization information, said method further comprising:

responsive to the selection of the finalization action, conveying a digitally encoded message to a previously specified message receiving account of each of the different collaborative shoppers other than the shopper who initiated the finalization action; and receiving responses to the digitally encoded messages, each response indicating an election to finalize the purchase or an option to not finalize the purchase.

5. The method of claim 4, further comprising:

removing items from the shared shopping cart corresponding to shoppers that elected to not finalize the purchase; and proceeding with the sale for the remaining items by performing the purchasing of the items, where the items involved in the purchasing consist of the remaining items present in the shared shopping cart after the removing of the items from shoppers that elected not to finalize the purchase.

6. The method of claim 1, wherein the at least one e-commerce site comprises a plurality of different e-commerce sites, which are independently owned and operated from one another, wherein the adding of items by at least one of the collaborative shoppers occurs from different locations, said method further comprising:

responsive to the selection of the finalization action, aggregating applicable promotions of the e-commerce sites based on the items in the shared shopping cart;

generating recommendations and discounts for items not currently in the shared shopping cart based in part of the promotions and recommendations given the items of the shared shopping cart;

responsive to the selection of the finalization action, conveying a digitally encoded message to a previously specified message receiving account of each of the different collaborative shoppers other than the shopper who initiated the finalization action, wherein at least one of the digitally encoded message comprises one of the discounts and recommendations;

presenting the discounts and recommendations via the to the purchaser who triggered the finalization action and to at least one of the different collaborative shoppers, which is presented within the digitally shopper specific browser interface; and receiving responses for the discounts and recommendations, which includes at least one positive response, which results in at least one additional item being added to the shared shopping cart prior to the purchasing of the items; and receiving responses to the digitally encoded messages from at least a portion of the different shoppers that received the digitally encoded message, each response indicating an election to finalize the purchase or an option to not finalize the purchase.

7. The method of claim 1, wherein the adding of items to the shared shopping cart comprises:

each collaborative shopper selecting items from a set of for sale items advertised on the at least one e-commerce site, wherein the selected items that are added to the shared shopping cart are determined by the collaborative shopper at the time at which they are added and were not previously specified or suggested to the collaborative shopper by the e-commerce site based upon a list of items designed for purchase by another, whereby the collaborative shopper is not selecting items from an online registry or the equivalent.

8. The method of claim 1, further comprising:

within a social networking web site, which is independent of any of the at least one e-commerce site, establishing a collaborative shopping group consisting of individuals with whom the establishing user has a social networking affiliation;

wherein after an initial establishment of the collaborative shopping group, each individual within the group is able to add additional individuals to the collaborative shopping group, wherein each of the additional individuals is one with whom the adding user has a social networking affiliation; and wherein the different collaborative shoppers associated with the shared shopping cart consists of the members of the collaborative shopping group, which includes at least one additional individual not included in the collaborative shopping group originally entered by the establishing user.

9. A method for collaborative shopping within a social network comprising:

establishing, using a computer processor, a collaborative shopping group within a social networking web site, wherein the collaborative shopping group comprises a group of individuals with whom an individual in the group of individuals has a social networking affiliation;

permitting each individual within the collaborative shopping group to add additional individuals to the collaborative shopping group;

establishing a shared shopping cart for the collaborative shopping group;

a plurality of different members of the collaborative shopping group individually and independently adding items from a plurality of different e-commerce sites to the shared shopping cart, wherein each of the different e-commerce sites has a unique URL and is independently owned and operated from the social networking web site and from each other;

each of the members specifying a purchasing leeway for each of the items, wherein each purchasing leeway includes a deviation extent from specifics of the respective item added to the shared shopping cart;

determining a transaction discount for a purchase of the items in the shared shopping cart, wherein the discount is greater than or equal to a sum of discounts that would have resulted if discreet purchases of the items were made without using the shared shopping cart;

disproportionately allocating the transaction discount to each member so that the members with a greater purchasing leeway receive a higher portion of the discount than the members with a lesser purchasing leeway; and completing an e-commerce purchase of items in the shared shopping cart, wherein the e-commerce purchase receives the allocated transaction discount.

10. The method of claim 9, wherein the members of the collaborative shopping group are granted an ability to include and exclude others from the collaborative shopping group in accordance with social networking based rules of the social networking site.

11. The method of claim 9, wherein only members of the social networking site are permitted to be members of the collaborative shopping group.

12. The method of claim 9, further comprising:

the collaborative shopping group purchasing a preferred annual membership for a price from at least one of the e-commerce sites, wherein the preferred membership entitles any member of the collaborative shopping group to receive preferred annual membership benefits when completing a purchase of items that the member placed in the shared shopping cart, where the preferred annual membership benefits would otherwise not be applied to purchases made by that member who individually lacks the preferred annual membership.

13. The method of claim 9, wherein members of the collaborative shopping group receive incentives for purchases made by others that result from purchases, ratings, or recommendations provided by an incentive received by one of the members which caused at least one of the other members to complete a purchase.

14. The method of claim 9, wherein the different members who placed items in the shared shopping cart are referred to as collaborative shoppers, wherein the completing of the e-commerce purchase comprises:

any of said collaborative shoppers selecting a sale finalization action via their browser interface;

responsive to the selection of the finalization action, confirming that each of the collaborative shoppers of the plurality elect to finalize a sale of the items in the shared shopping cart;

only when each of said collaborative shoppers has finalized the sale of items in the shared shopping cart, purchasing the items in the shared shopping cart from the at least one e-commerce sites;

wherein for the purchase, a shared shopping cart transactional discount is provided for the purchase which is greater than or equal to a sum of transactional discounts that would have been granted where the collaborative shared shopping cart items purchased separately as individual specific discrete transactions;

for the purchase, each of the different collaborative shoppers paying a shopper specific amount for the items which that shopper placed in the shared shopping cart, wherein said shopper specific amount does not exceed an amount that would have been paid were the items purchased separately by the shopper as an individual specific discrete transaction; and;

shipping each of the purchased items of the shared shopping cart to postal/mail/other addresses specified by the different collaborative shoppers.

15. The method of claim 9, further comprising:

establishing at least one alert for the shared shopping cart that is triggered upon an occurrence of a user defined condition of a user of the collaborative shopping group relating to a purchase of a different user in the collaborative shopping group;

detecting the occurrence and responsibly triggering the alert;

presenting the alert to the user.

16. The method of claim 9, further comprising:

detecting a proximity of a first user of the collaborative shopping group to a physical store having an item in inventory matching an item in the shared shopping cart, said item being for a second user of the collaborative shopping group;

providing a notification to the first user of the item and its presence in the physical store;

the first user purchasing the item in the physical store; and responsive to the purchasing, updating the shared shopping cart for at least the second user to indicate that the first user has purchased the item for the second user.

17. The method of claim 14, wherein the adding of items by at least one of the collaborative shoppers occurs at different times from different locations, said method further comprising:

responsive to the selection of the finalization action, aggregating applicable promotions of the e-commerce sites based on the items in the shared collaborative shopping cart;

generating recommendations and discounts for items not currently in the shared collaborative shopping cart based in part of the promotions and recommendations given the items of the shared shopping cart;

responsive to the selection of the finalization action, conveying a digitally encoded message to a previously specified message receiving account of each of the different collaborative shoppers other than the shopper who initiated the finalization action, wherein at least one of the digitally encoded message comprises one of the discounts and recommendations;

conveying a digital message comprising the discounts and recommendations to at least one member of the collaborative shopping group that did not place an item in the collaborative shopping cart;

presenting the discounts and recommendations via the to the purchaser who triggered the finalization action and to at least one of the different collaborative shoppers, which is presented within the digitally shopper specific browser interface; and receiving responses for the discounts and recommendations, which includes at least one positive response, which results in at least one additional item being added to the shared shopping cart prior to the purchasing of the items; and receiving responses to the digitally encoded messages from at least a portion of the different shoppers that received the digitally encoded message, each response indicating an election to finalize the sale or an option to not finalize the sale.

18. The method of claim 9, the adding of items in the shared shopping cart further comprising:

detecting items placed in at least one of individual shopping carts and individual wish lists of the different e-commerce sites but not purchased by members of the collaborative shopping group; and extracting the detected items from the at least one of the individual shopping carts and individual wish lists and placing them in the shared shopping cart.

19. One or more non-transitory computer readable medium comprising instructions which when executed by a computer cause the computer to perform the following steps:

establishing, using a computer processor, a collaborative shopping group within a social networking web site, wherein the collaborative shopping group comprises a group of individuals with whom an individual in the group of individuals has a social networking affiliation;

permitting each individual within the collaborative shopping group to add additional individuals to the collaborative shopping group;

establishing a shared shopping cart for the collaborative shopping group;

from a plurality of different members of the collaborative shopping group individually and independently, receiving items from a plurality of different e-commerce sites into the shared shopping cart, wherein each of the different e-commerce sites has a unique URL and is independently owned and operated from the social networking web site and from each other;

from each of the members, receiving a purchasing leeway for each of the items, wherein each purchasing leeway includes a deviation extent from specifics of the respective item added to the shared shopping cart;

determining a transaction discount for a purchase of the items in the shared shopping cart, wherein the discount is greater than or equal to a sum of discounts that would have resulted if discreet purchases of the items were made without using the shared shopping cart;

disproportionately allocating the transaction discount to each member so that the members with a greater purchasing leeway receive a higher portion of the discount than the members with a lesser purchasing leeway; and completing an e-commerce purchase of items in the shared shopping cart, wherein the e-commerce purchase receives the allocated transaction.

\* \* \* \* \*